(12) United States Patent
Le

(10) Patent No.: US 11,054,360 B2
(45) Date of Patent: Jul. 6, 2021

(54) DEVICE AND METHOD FOR MEASURING AND TRACKING THE QUANTITY OR CONCENTRATION OF A COMPOUND IN A FLUID

(71) Applicant: eLICHENS, Grenoble (FR)

(72) Inventor: Thanh Trung Le, Grenoble (FR)

(73) Assignee: eLICHENS, Grenoble (FR)

( * ) Notice: Subject to any disclaimer, the term of this patent is extended or adjusted under 35 U.S.C. 154(b) by 0 days.

(21) Appl. No.: 16/606,981

(22) PCT Filed: Apr. 20, 2018

(86) PCT No.: PCT/FR2018/051001
§ 371 (c)(1),
(2) Date: Oct. 21, 2019

(87) PCT Pub. No.: WO2018/202974
PCT Pub. Date: Nov. 8, 2018

(65) Prior Publication Data
US 2020/0132588 A1    Apr. 30, 2020

(30) Foreign Application Priority Data
May 4, 2017 (FR) ...................... 1753938

(51) Int. Cl.
*G01N 15/14* (2006.01)
*G01N 21/3504* (2014.01)

(52) U.S. Cl.
CPC ..... *G01N 15/1429* (2013.01); *G01N 21/3504* (2013.01); *G01N 15/1404* (2013.01)

(58) Field of Classification Search
CPC ............ G01N 15/1429; G01N 15/1404; G01N 21/3504; G01N 2201/124; G01N 21/783;
(Continued)

(56) References Cited

U.S. PATENT DOCUMENTS 4,863,265 A    9/1989    Flower et al.
6,825,471 B1   11/2004   Shulga et al.
(Continued)

FOREIGN PATENT DOCUMENTS

WO    WO 2007/064370 A2    6/2007

OTHER PUBLICATIONS

International Search Report dated Jun. 27, 2018 in PCT/FR2018/051001 filed Apr. 20, 2018.
(Continued)

*Primary Examiner* — Hoa Q Pham
(74) *Attorney, Agent, or Firm* — Oblon, McClelland, Maier & Neustadt, L.L.P.

(57) ABSTRACT

A device for measuring and tracking over time the quantity or concentration of a component in a fluid comprises: a sensor capable of measuring a quantity or concentration of the component in the fluid and providing a quantitative signal for tracking this quantity or concentration over time; a signal-processing module comprising a low-pass filter of the quantitative tracking signal; and an output interface for providing the filtered quantitative tracking signal. The signal-processing module comprises an estimator of a value of instantaneous trend of variation of the quantitative tracking signal in a predetermined sliding time window. Also provided is means for adjusting over time a high cutoff frequency of the low-pass filter according to the estimated value of instantaneous trend of variation.

11 Claims, 1 Drawing Sheet

(58) Field of Classification Search
CPC ... A61B 5/7203; A61B 5/04001; A61B 5/725; A61B 5/4041; A61B 5/0484; A61N 1/20
USPC .......................... 356/432–440; 702/19, 100
See application file for complete search history.

(56) References Cited

U.S. PATENT DOCUMENTS

| | | | |
|---|---|---|---|
| 2003/0058439 A1 | 3/2003 | Martin | |
| 2008/0009762 A1* | 1/2008 | Hampton | A61B 5/0836 600/532 |
| 2017/0138846 A1* | 5/2017 | Alizadeh | G01N 21/274 |

OTHER PUBLICATIONS

Géry Casiez, et al., "1€ Filter: A Simple Speed-based Low-pass Filter for Noisy Input in Interactive Systems," Proceedings of the 2012 ACM Annual Conference on Human Factors in Computing Systems, CHI' 12, XP055422465, May 2012, 4 Pages.

Jorge Antonio Silva Centeno, et al., "Adaptive Low-Pass Fuzzy Filter for Noise Removal," Photogrammetric Engineering & Remote Sensing, vol. 61, No. 10, XP055422801, Oct. 1995, pp. 1267-1272.

Richard G. Lyons, "Understanding Digital Signal Processing," Third Edition, Prentice Hall Publishing, Retrieved from the Internet [URL:http://www.iro.umontreal.ca/~mignotte/IFT3205/Documents/UnderstandingDigitalSignalProcessing.pdf], 2011, pp. 539-544 of the online version corresponding to pp. 613-614 of the original (with Table of Contents).

* cited by examiner

DEVICE AND METHOD FOR MEASURING AND TRACKING THE QUANTITY OR CONCENTRATION OF A COMPOUND IN A FLUID

CROSS REFERENCE TO RELATED APPLICATION

This application is a national phase application of PCT/FR2018/051001, filed Apr. 20, 2018, which claims priority to French Patent Application No. 1753938, filed May 4, 2017, where the entire content and disclosure of each of the foregoing applications is incorporated by reference into the present application.

BACKGROUND OF THE INVENTION

Field of the Invention

The present invention relates to a device for measuring and tracking over time the quantity or concentration of a component in a fluid. It also relates to a corresponding method and computer program.

The invention applies more particularly to a device comprising:
- a sensor capable of measuring a quantity or concentration of the component in the fluid and providing a quantitative signal for tracking this quantity or concentration over time,
- a signal-processing module comprising a low-pass filter of the quantitative tracking signal, and
- an output interface for providing the filtered quantitative tracking signal.

Description of the Related Art

The industrial uses are multiple, for the detection of gaseous, liquid or solid components in any gaseous or liquid fluids. The sensors that can be used are also multiple and depend on the intended uses. A non-limiting example is the search for certain gaseous species in the air, such as identified pollutants and/or greenhouse gases, using optical detection methods based on the spectral absorption properties of the various species that can compose a gas and on the Beer-Lambert law. The sensor can in this case be of the NDIR type (from "Non-Dispersive InfraRed"), that is to say having a non-dispersive infrared emitter and, in general, a thermopile detector.

A device of this type is for example described in the patent application US 2003/0058439 A1 or in the patent application WO 2007/064370 A2. Other devices using the same optical method but further having optimized production costs and bulk are also marketed by the applicant with MEMS technology (from "MicroElectroMechanical Systems"). They can be integrated into portable electronic systems such as tablet computers, mobile phones, cameras or other. They can also be integrated into stationary systems in home automation, industrial detection or analysis of air quality. The signals that they provide can be advantageously used for a display of information or for a triggering of an alert in the case of an identified danger.

But for a better use of the signals provided by this type of device, said signals only rarely come directly from the sensor. They generally undergo a processing comprising at least a slight low-pass filtering aimed at removing certain noises or artefacts from the signals. This filtering further causes a smoothing facilitating the reading of the information or the interpretation of the detection. In return, it introduces a latency between the estimated quantity or concentration of component and the actual quantity or concentration at each instant. This latency can raise an issue in certain uses in which a rapid increase or decrease in a component, judged dangerous or vital, in a fluid requires precise detection and increased reactivity (triggering of an alarm or of a plan of actions). A compromise, which is always unsatisfactory, must thus be found between the effectiveness and the latency of the low-pass filtering.

It can thus be desired to provide a device which allows to at least partially overcome the aforementioned compromise.

BRIEF SUMMARY OF THE INVENTION

A device is therefore proposed for measuring and tracking over time the quantity or concentration of a component in a fluid, comprising:
- a sensor capable of measuring a quantity or concentration of the component in the fluid and providing a quantitative signal for tracking this quantity or concentration over time,
- a signal-processing module comprising a low-pass filter of the quantitative tracking signal, and
- an output interface for providing the filtered quantitative tracking signal, wherein the signal-processing module comprises:
- an estimator of a value of instantaneous trend of variation of the quantitative tracking signal in a predetermined sliding time window, and
- means for adjusting over time a high cutoff frequency of the low-pass filter according to the estimated value of instantaneous trend of variation.

By acting on the high cutoff frequency of the low-pass filtering, action is generally taken directly on the latency: the lower the high cutoff frequency, the smoother and easier to interpret the quantitative tracking signal but the higher the latency introduced; on the contrary, the higher the high cutoff frequency, the lower the latency but the more noisy and difficult to interpret the quantitative tracking signal. Thus, the invention allows to dynamically adapt this high cutoff frequency according to an estimation of variation of the quantitative tracking signal in a predetermined sliding time window which can be much shorter than the latency of a low-pass filter, the parameters of which result from an unsatisfactory compromise as mentioned above. By doing so, the low-pass filtering is adapted in real time to the variability of the signal and the compromise becomes dynamic and thus satisfactory.

Moreover, it is noted that the notion of low-pass filter includes that of band-pass filter. Indeed, a band-pass filter must be considered to be a particular case of a low-pass filter, i.e. a low-pass filter further having a low cutoff frequency lower than its high cutoff frequency.

Optionally, the estimator is designed to estimate the value of instantaneous trend of variation of the quantitative tracking signal by providing a value of slope of this signal in the predetermined sliding time window, in particular via linear regression. This particularly simple estimation can be carried out in very short times.

Also optionally, the adjustment means are designed in such a way as to:
reduce the high cutoff frequency of the low-pass filter when the absolute value of the estimated value of instantaneous trend of variation decreases, and increase the high cutoff frequency of the low-pass filter when the absolute value of the estimated value of instantaneous trend of variation increases.

Also optionally, the low-pass filter is designed to carry out, after temporal sampling of the quantitative tracking signal, a digital filtering by exponentially weighted moving average according to the following time recurrence relation:

$$\begin{cases} \bar{y}_1 = y_1 \\ \forall i \geq 2, \bar{y}_i = \alpha \cdot \bar{y}_{i-1} + (1-\alpha) \cdot y_i \end{cases},$$

where $y_1, \ldots, y_i, \ldots$ are successive time samples of the quantitative tracking signal, $\bar{y}_1, \ldots, \bar{y}_i, \ldots$ are the successive time samples resulting from the filtered quantitative tracking signal and $\alpha$ is an exponential-weighting coefficient of the digital filtering by moving average between 0 and 1 and mathematically related to the high cutoff frequency $f_c$ of this digital filtering. This type of low-pass filtering is particularly simple to adjust using a single parameter, in this case $\alpha$.

Also optionally, the adjustment means are configured using fuzzy logic in such a way as to:
distinguish N states of instantaneous trend of variation, N≥2, each of these N states being associated with a predetermined corresponding value of high cutoff frequency of the low-pass filter and with a membership function with values in the interval [0; 1] defined in a range of possible values of instantaneous trend of variation, and
adjust the high cutoff frequency of the low-pass filter as a sum of the N predetermined values of high cutoff frequency respectively weighted by N degrees of membership of the estimated value of instantaneous trend of variation in each of the N states of instantaneous trend of variation, these degrees of membership being calculated using the N membership functions.

The configuration using fuzzy logic provides an adjustment that is reactive but without rupture of the low-pass filtering.

Also optionally, N≥3 and:
a first stable state is associated with a high cutoff frequency linked to a value of the exponential weighting coefficient $\alpha$ between 0.9 and 1,
a second state of slow variation is associated with a high cutoff frequency linked to a value of the exponential weighting coefficient $\alpha$ between 0.7 and 0.9, and
a third state of fast variation is associated with a high cutoff frequency linked to a value of the exponential weighting coefficient $\alpha$ between 0.1 and 0.3.

Also optionally, each membership function is a Gaussian or piecewise linear function. These functions are simple to implement using fuzzy logic.

Also optionally, the sensor is a gas sensor with a non-dispersive infrared emitter and a thermopile detector. In this case, the invention allows a use in the detection of gas in a gaseous medium.

A method is also proposed for measuring and tracking over time the quantity or concentration of a component in a fluid, comprising the following steps:
measuring a quantity or concentration of the component in the fluid and providing a quantitative signal for tracking this quantity or concentration over time, using a sensor,
processing the quantitative tracking signal using a low-pass filter, and
providing the filtered quantitative signal at the output, wherein the processing of the quantitative tracking signal comprises:
an estimation over time of an instantaneous trend of variation of the quantitative signal in a predetermined sliding time window, and
the adjustment over time of a high cutoff frequency of the low-pass filter according to the estimated instantaneous trend of variation.

A computer program is also proposed, downloadable from a communication network and/or recorded on a medium readable by computer and/or executable by a processor, comprising instructions for the execution of the following steps:
receiving a quantitative digital signal for tracking a quantity or concentration over time of a component in a fluid, and
processing the quantitative tracking signal by low-pass filtering,
the low-pass filtering being carried out using instructions for the execution of the following steps:
estimating over time an instantaneous trend of variation of the quantitative signal in a predetermined sliding time window, and
adjusting over time a high cutoff frequency of the low-pass filtering according to the estimated instantaneous trend of variation.

BRIEF DESCRIPTION OF THE DRAWINGS

The invention will be better understood with the help of the following description, given only as an example and made with reference to the appended drawings in which.

DETAILED DESCRIPTION OF THE INVENTION

Figure 1:
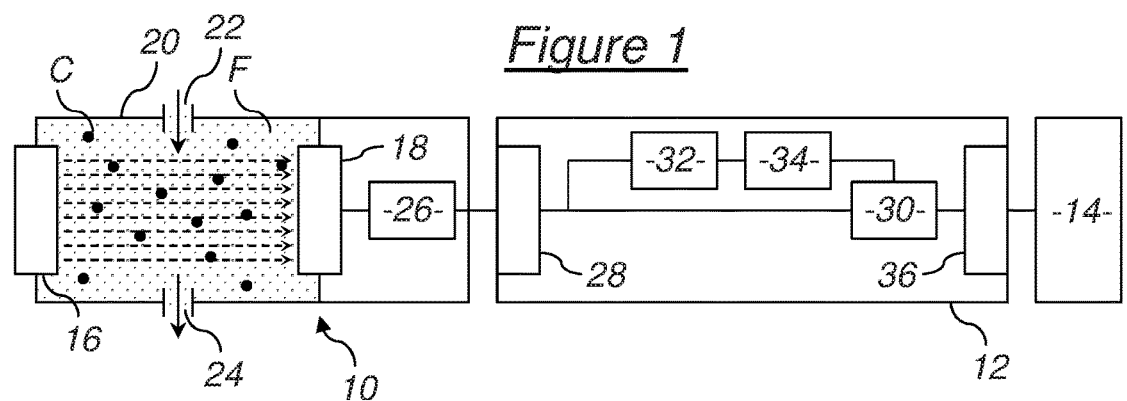
FIG. 1 schematically shows the overall structure of a device for measuring and tracking the quantity or concentration of a component in a fluid, according to an embodiment of the invention.

The device illustrated in FIG. 1, suitable for the measurement and tracking over time of the quantity or concentration of a component C in a fluid F, comprises a sensor 10, a signal-processing module 12 and a module 14 for using data provided by the module 12.

The sensor 10 is capable of measuring a quantity or concentration of the component C in the fluid F and providing a quantitative signal for tracking this quantity or concentration over time. According to the example precisely illustrated in FIG. 1 but not limiting, the sensor 10 is a sensor of gaseous species in a gaseous medium of the NDIR type, that it to say with an infrared emitter 16 and a thermopile detector 18. In this specific case, the fluid F is a gas and the component C is a particular gaseous species, the quantity or concentration of which in F is desired to be tracked. More precisely, the sensor 10 comprises a chamber 20 provided with a first opening 22 by which the gas to be analysed F enters and a second opening 24 by which this same gas F exits. The input and/or the output of gas can be forced, by the maintaining of a pressure differential, or spontaneous, by simple diffusion effect. The infrared emitter 16 illuminates the gas F inside the chamber in a predetermined spectral band and the thermopile detector 18 receives the light radiation transmitted by the gas F. This light radiation has undergone certain absorptions directly linked to the quantity or concentration of the component C in the gas F. Then, a converter 26 of the sensor 10 transforms the analogue light radiation received by the thermopile detector 18 into a sampled digital signal, directly linked to the absorption of the light radiation by the component C in the gas F and finally representative of the quantity or concentration of the component C measured at each sampling time. This quantitative tracking signal is noted as $y_1, \ldots, y_i, \ldots$ in the rest of the description.

The signal-processing module 12 receives the quantitative tracking signal $y_1, \ldots, y_i, \ldots$ via an input interface 28. It further comprises a low-pass filter 30 and an estimator of instantaneous variation 32 to which it transmits this signal $y_1, \ldots, y_i, \ldots$. The estimator 32 is more precisely designed to calculate a value V of instantaneous trend of variation of the quantitative tracking signal in a sliding time window having a predetermined length T. Advantageously, this length T is much less than the latency that the low-pass filter 30 can cause. Moreover, according to the general principles of the invention, the module 12 also comprises means 34 for adjusting over time a high cutoff frequency $f_C$ of the low-pass filter 30 according to the value of instantaneous trend of variation returned by the estimator 32. Finally, it comprises an output interface 36 for providing the filtered quantitative tracking signal. This filtered signal is noted as $\bar{y}_1, \ldots, \bar{y}_i, \ldots$ in the rest of the description.

In a preferred embodiment, the estimator of instantaneous variation 32 is designed to estimate the value V of instantaneous trend of variation of the quantitative tracking signal $y_1, \ldots, y_i, \ldots$ by providing a value of slope of this signal in the predetermined sliding time window, in particular via linear regression. Such a linear regression is relevant if it can be supposed that the quantitative tracking signal is approximately linear in the time window considered, which is often the case in short time intervals. By noting for example as $x_{i-T}, \ldots, x_i$ the T sampling times of the sliding time window at a time $x_i$ at which it is desired to estimate the value V, the linear regression involves expressing the corresponding tracking signal $y_{i-T}, \ldots, y_i$ in the following form:

$$\begin{bmatrix} y_{i-T} \\ \vdots \\ y_i \end{bmatrix} = \begin{bmatrix} 1 & x_{i-T} \\ \vdots & \vdots \\ 1 & x_i \end{bmatrix} \cdot \begin{bmatrix} a_0 \\ a_1 \end{bmatrix} + \begin{bmatrix} \varepsilon_{i-T} \\ \vdots \\ \varepsilon_i \end{bmatrix},$$

and determining the values $\widehat{a_0}$ and $\widehat{a_1}$ that minimise the zero-mean residual errors $\varepsilon_{i-T}, \ldots, \varepsilon_i$.

By noting:

$$Y = \begin{bmatrix} y_{i-T} \\ \vdots \\ y_i \end{bmatrix} \text{ and } X = \begin{bmatrix} 1 & x_{i-T} \\ \vdots & \vdots \\ 1 & x_i \end{bmatrix},$$

the value $$\hat{A} = \begin{bmatrix} \widehat{a_0} \\ \widehat{a_1} \end{bmatrix}$$

which is the least-squares solution by minimisation of the mean quadratic error is estimated in the following manner: $\hat{A} = [X^T X]^{-1} \cdot X^T \cdot Y$, where $X^T$ is the transpose of the matrix X.

As a result, the value V of instantaneous trend of variation can be chosen as equal to the absolute value of the slope $\widehat{a_1}$. As indicated by the above calculations and in accordance with the notion of sliding time window, this value V can be revised upon each reception of a new sample of quantitative tracking signal.

Also in a preferred embodiment, the adjustment means 34 are designed to:

reduce the high cutoff frequency $f_C$ of the low-pass filter 30 when the absolute value of the value V of instantaneous trend of variation calculated by the estimator 32 decreases, and increase the high cutoff frequency $f_C$ of the low-pass filter 30 when the absolute value of the value V of instantaneous trend of variation calculated by the estimator 32 increases.

In this case, a direct relation between V and $f_C$ can be predefined in the adjustment means, for example in the form of an increasing function, in order to adjust the high cutoff frequency $f_C$ according to V. Since the value V can be revised upon each reception of a new sample of quantitative tracking signal, the high cutoff frequency $f_C$ can also be adjusted at the same rate.

Also in a preferred embodiment, the low-pass filter 30 is digital and designed to carry out on the sampled quantitative tracking signal $y_1, \ldots, y_n, \ldots$ a digital filtering by exponentially weighted moving average according to the following time recurrence relation:

$$\begin{cases} \bar{y}_1 = y_1 \\ \forall n \geq 2, \bar{y}_i = \alpha \cdot \bar{y}_{i-1} + (1-\alpha) \cdot y_i \end{cases},$$

where $\alpha$ is an exponential-weighting coefficient of the digital filtering by moving average between 0 and 1 and mathematically related to the high cutoff frequency $f_C$ of this digital filtering. It can for example be demonstrated on the basis of the above time recurrence relation that this mathematical relation takes the following form for an estimation of the high cutoff frequency at −3 dB:

$$f_C = \frac{F_S}{2\pi} \cos^{-1}\left[\max\left(-1; 1 - \frac{(1-\alpha)^2}{2\alpha}\right)\right],$$

where $F_S$ is the sampling frequency, $\cos^{-1}$ is the inverse of the cosine function and max (;) is the function that returns the maximum between two values.

This mathematical relation results in particular from the teaching of the work by Rick Lyons, entitled "Understanding Digital Signal Processing", 3$^{rd}$ edition, Prentice Hall Publishing, 2011, pages 613-614. It can be simplified in the following manner when $f_C$ remains small compared to $F_S$, in particular as long as $f_C \leq 0.1 F_S$:

$$f_C = -\frac{F_S}{2\pi} \ln(\alpha).$$

In this case, the direct relation between V and $f_C$ can be predefined in total equivalence by a direct relation between V and $\alpha$.

In a preferred embodiment, this direct relation is configured using fuzzy logic in the adjustment means 34 in the following manner:

N discrete states of instantaneous trend of variation are defined and distinguished, N≥2, each of these N states being associated with a predetermined corresponding value $f_C(n)$ of high cutoff frequency $f_C$ of the low-pass filter 30, or in an equivalent manner with a predetermined corresponding value $\alpha(n)$ of the weighting coefficient $\alpha$, and with a membership function $F_{MS,n}$ with values in the interval [0; 1] defined in a range of possible values for V (for example included in [0; +∞[), and adjust the high cutoff frequency $f_C$ of the low-pass filter 30, or in an equivalent manner the weighting coefficient $\alpha$, as a sum of the N predetermined values of high cutoff frequency, or in an equivalent manner as a sum of the N predetermined values of the weighting coefficient, respectively weighted by N degrees of membership of the estimated value V in each of the N states of instantaneous trend of variation, these degrees of membership being calculated using the N membership functions.

Each membership function is for example a Gaussian or piecewise linear function. Any other family of membership functions well known in fuzzy logic is also possible and can be adapted according to the needs of the intended use and the context.

The elements 30, 32, 34 of the signal-processing module 12, as illustrated in FIG. 1 and functionally described in detail above, can for example be implemented in at least one computer device such as a conventional computer comprising a processor associated with one or more memories for the storage of files of data and computer programs, or even directly in one or more processors associated with one or more memories.

These functional modules thus comprise a plurality of computer programs or a plurality of functions of the same computer program, these programs or functions being able to be grouped together according to any possible combination into one or more pieces of software. They could also be at least partly microprogrammed or microwired into dedicated integrated circuits. Thus, alternatively, each computer device implementing one or more of the functional modules described above could be replaced by an electronic device composed only of digital circuits (without a computer program) for carrying out the same actions.

The module 14 for using data provided by the module 12 receives the filtered signal $\bar{y}_1, \ldots, \bar{y}_i, \ldots$. In a manner known per se, it uses and processes this signal for a display of information or for a triggering of an alert in case of a problem, for example in the case of a predetermined threshold of the detected quantity or concentration of component C in the gas F being exceeded. Its operation will not therefore be described in detail. It is simply noted that the processing carried out by the module 12 can include a conversion of the filtered signal $\bar{y}_1, \ldots, \bar{y}_i, \ldots$ into a signal directly representative of the quantity of concentration of the component C measured at each sampling time, this conversion being carried out in a manner known per se by use of the Beer-Lambert law.

It is noted that the sensor 10, the signal-processing module 12 and the module 14 for use of data can be structurally separated. Thus, the device illustrated in FIG. 1 can be designed as a single piece or as a plurality of distinct physical elements connected to each other by wired or wireless data-transmission means. The various possible configurations are guided by the intended uses.

Figure 2:
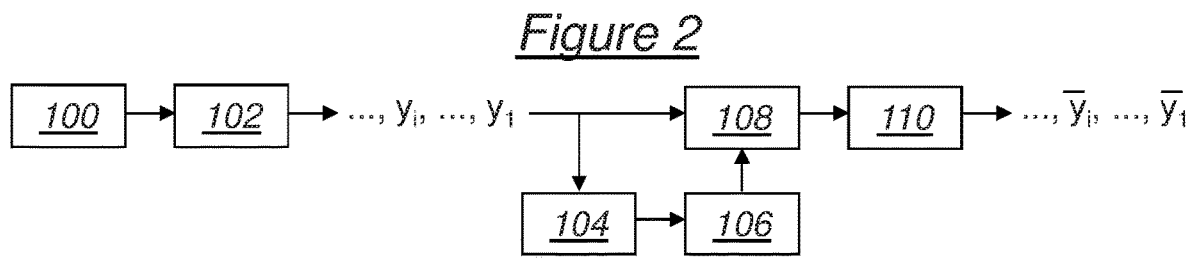
FIG. 2 illustrates the successive steps of a method for measuring and tracking the quantity or concentration of a component in a fluid implemented by the device of FIG. 1.

The operation of the device of FIG. 1 will now be described in detail in reference to the various steps of the method illustrated in FIG. 2.

During a step 100 executed continuously by the sensor 10, the thermopile detector 18 provides a continuous analogue signal of measurement of light absorption by the component C of light radiation emitted by the infrared emitter 16 and transmitted by the gas F.

During a step 102 executed continuously by the converter 26 of the sensor 10, the continuous analogue signal provided by the thermopile detector 18 by execution of the step 100 is digitally converted in order to provide the successive time samples of the quantitative tracking signal $y_1, \ldots, y_i, \ldots$.

During a step 104 executed at each instant of the time sampling by the estimator 32, a value V of instantaneous trend of variation of the quantitative tracking signal $y_1, \ldots, y_i, \ldots$ in a sliding time window having a predetermined length N is calculated.

During a step 106 executed at each instant of the time sampling by the adjustment means 34, the high cutoff frequency $f_C$ of the low-pass filter 30, or in an equivalent manner the aforementioned weighting coefficient $\alpha$ in the case of digital filtering by exponentially weighted moving average, is adjusted according to the value V estimated in step 104.

During a step 108 executed at each instant of the time sampling by the low-pass filter 30 which applies the high cutoff frequency $f_C$, or in an equivalent manner the aforementioned weighting coefficient $\alpha$ in the case of digital filtering by exponentially weighted moving average, the quantitative tracking signal $y_1, \ldots, y_i, \ldots$ is filtered and transformed into $\bar{y}_1, \ldots, \bar{y}_i, \ldots$.

This filtered quantitative tracking signal $\bar{y}_1, \ldots, \bar{y}_i, \ldots$ is progressively transmitted to the module 14 for use of data by the output interface 36 during a step 110 executed at each instant of the time sampling by the latter.

Figure 3:
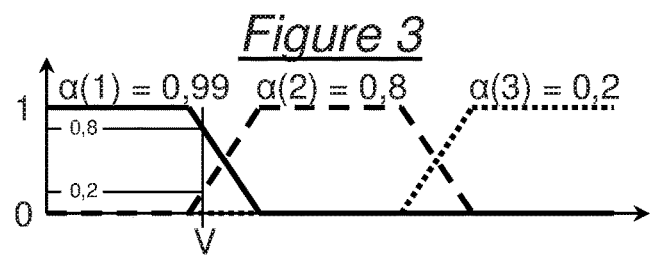
FIG. 3 illustrates a diagram of membership functions of a fuzzy logic model used by the method of FIG. 2, and FIGS. 4 and 5 illustrate using diagrams the intermediate and final results of an implementation of the method of FIG. 2.

A simple and concrete example of calculation of the aforementioned weighting coefficient $\alpha$ according to the value V estimated at each instant of time sampling is illustrated in FIG. 3. In accordance with the configuration using fuzzy logic presented in general above, for N=3:

a first stable state is associated with a high cutoff frequency linked to a value $\alpha(1)$ of the exponential weighting coefficient $\alpha$ between 0.9 and 1, for example $\alpha(1)=0.99$;

a second state of slow variation is associated with a high cutoff frequency linked to a value $\alpha(2)$ of the exponential weighting coefficient a between 0.7 and 0.9, for example $\alpha(2)=0.8$; and a third state of fast variation is associated with a high cutoff frequency linked to a value $\alpha(3)$ of the exponential weighting coefficient $\alpha$ between 0.1 and 0.3, for example $\alpha(3)=0.2$.

The stable state is associated with a first membership function $F_{MS,1}$ with values in the interval [0; 1] defined in the range of values [0; +∞[. For a simple illustration, this first membership function is piecewise linear in the example of FIG. 3. It first of all continuously takes the value 1 in a first interval, then decreases linearly towards 0 in a second interval, then continuously takes the value 0 in the rest of the range of values.

The slow state of variation is associated with a second membership function $F_{MS,2}$ with values in the interval [0; 1] defined in the range of values [0; +∞[. For a simple illustration, this second membership function is also piecewise linear. It first of all continuously takes the value 0 in the first interval, then increases linearly towards 1 in the second interval, then continuously takes the value 1 in a third interval, then linearly decreases towards 0 in a fourth interval, then continuously takes the value 0 in the rest of the range of values.

The fast state of variation is associated with a third membership function $F_{MS,3}$ with values in the interval [0; 1] defined in the range of values [0; +∞[. For a simple illustration, this third membership function is also piecewise linear. It first of all continuously takes the value 0 in the first, second and third intervals, then increases linearly towards 1 in the fourth interval, then continuously takes the value 1 in the rest of the range of values.

The weighting coefficient α is thus determined from the value V estimated at each instant of time sampling by the following relation:

$$\alpha = F_{MS,1}[V] \cdot \alpha(1) + F_{MS,2}[V] \cdot \alpha(2) + F_{MS,3}[V] \cdot \alpha(3),$$

or, for example in the precise illustration of FIG. 3:

$$\alpha = 0.8 \times 0.99 + 0.2 \times 0.8 + 0 \times 0.2 = 0.952.$$

Figure 4:
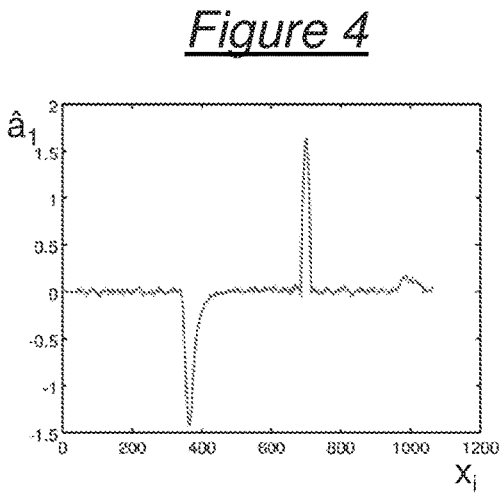
Figure 5:
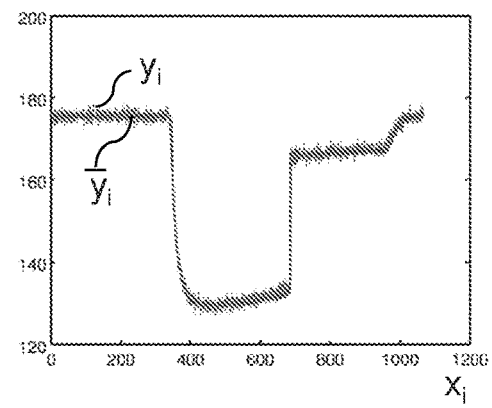

FIGS. 4 and 5 illustrate results obtained on a quantitative tracking signal with 1100 successive samples. FIG. 4 illustrates 1100 successive values of slope $\widehat{a_1}$ calculated by the estimator 32. A relative stability of the quantitative tracking signal is observed until about the sample 340, then a rapid decrease around the sample 340, then again a relative stability until about the sample 680, then a rapid increase around the sample 680, then a relative stability until about the sample 950, then a slow increase between the sample 950 and 1050, then a relative stability after the sample 1050. FIG. 5 illustrates the quantitative tracking signal before and after low-pass filtering using, as mentioned above, the instantaneous variations of FIG. 4. It is very clear that the quantitative tracking signal before filtering detects without latency any fast variation in quantity or concentration of component C in the gas F, but with the cost of very noisy values in the zones of stability or of slow variations. It is also very clear that the quantitative tracking signal after filtering also detects without latency any fast variation in quantity or concentration of component C in the gas F, with values that are not noisy in the zones of stability or of slow variations. The dynamic compromise in the adjustment of the high cutoff frequency of the low-pass filtering is thus very effective.

It is clear that a device for measuring and tracking like the one described above allows to measure and track, in a denoised manner and without bothersome latency, a quantity or concentration of a component C in a fluid F.

Moreover, it is noted that the invention is not limited to the embodiment described above in reference to FIGS. 1 and 2.

Thus for example, even though the low-pass filtering was proposed above directly on the signal coming from the thermopile detector 18, after sampling and digitisation, it could have also been proposed at another location in the processing chain, in particular after conversion according to the Beer-Lambert law. Nevertheless, this alternative is less advantageous because the exponential expression of the Beer-Lambert law leads to a significant amplification of the noised variations before low-pass filtering.

It will be clear more generally to a person skilled in the art that various modifications can be made to the embodiment described above, in light of the teaching that has just been disclosed to the person skilled in the art. In particular, even though the estimation of instantaneous variation of the quantitative tracking signal was advantageously recommended by linear regression because of the simplicity of this method, other methods known to a person skilled in the art for estimating a trend of instantaneous variation of a signal can be applied. Likewise, even though digital filtering by exponentially weighted moving average was recommended for the operation of the low-pass filter 30, other low-pass filters with an adjustable cutoff frequency, in particular other filters with infinite impulse response, are possible. Likewise, multiple direct relations between V and $f_C$ can be defined by a person skilled in the art, even if the configuration using fuzzy logic has particular advantages and is judicious.

In general, in the following claims, the terms used must not be interpreted as limiting the invention to the embodiment disclosed in the present description, but must be interpreted to include therein all the equivalents that the claims aim to cover due to their wording and the providing of which is within the reach of a person skilled in the art by applying their general knowledge to the implementation of the teaching that has just been disclosed to them.

The invention claimed is:

1. A device for measuring and tracking over time the quantity or concentration of a component in a fluid, comprising:
    a sensor capable of measuring a quantity or concentration of the component in the fluid and providing a quantitative signal for tracking this quantity or concentration over time,
    a signal-processing module comprising a low-pass filter of the quantitative tracking signal, and
    an output interface for providing the filtered quantitative tracking signal,
    wherein the signal-processing module comprises:
    an estimator of a value of instantaneous trend of variation of the quantitative tracking signal in a predetermined sliding time window, and
    means for adjusting over time a high cutoff frequency of the low-pass filter according to the estimated value of instantaneous trend of variation.

2. The measuring and tracking device according to claim 1, wherein the estimator is configured to estimate the value of instantaneous trend of variation of the quantitative tracking signal by providing a value of slope of the quantitative tracking signal in the predetermined sliding time window.

3. The measuring and tracking device according to claim 1, wherein the adjustment means are configured to:
    reduce the high cutoff frequency of the low-pass filter when the absolute value of the estimated value of instantaneous trend of variation decreases, and
    increase the high cutoff frequency of the low-pass filter when the absolute value of the estimated value of instantaneous trend of variation increases.

4. The measuring and tracking device according to claim 1, wherein the low-pass filter is configured to carry out, after time sampling of the quantitative tracking signal, a digital filtering by exponentially weighted moving average according to the following time recurrence relation:

$$\begin{cases} \overline{y}_1 = y_1 \\ \forall i \geq 2, \overline{y}_i = \alpha \cdot \overline{y}_{i-1} + (1-\alpha) \cdot y_i \end{cases},$$

where $y_1, \ldots, y_i, \ldots$ are successive time samples of the quantitative tracking signal, $\overline{y}_1, \ldots, \overline{y}_i, \ldots$ are successive time samples resulting from the filtered quantitative tracking signal and α is an exponential-weighting coefficient of the digital filtering by moving average between 0 and 1 and mathematically related to the high cutoff frequency $f_c$ of the digital filtering.

5. The measuring and tracking device according to claim 4, wherein N is a number of states of instantaneous trend of variation and N ≥3 and:
- a first stable state is associated with a high cutoff frequency linked to a value of the exponential weighting coefficient α between 0.9 and 1,
- a second state of slow variation is associated with a high cutoff frequency linked to a value of the exponential weighting coefficient α between 0.7 and 0.9, and
- a third state of fast variation is associated with a high cutoff frequency linked to a value of the exponential weighting coefficient α between 0.1 and 0.3.

6. The measuring and tracking device according to claim 1, wherein the adjustment means are configured using fuzzy logic in such a way as to:
- distinguish N states of instantaneous trend of variation, N ≥2, each of the N states being associated with a predetermined corresponding value of high cutoff frequency of the low-pass filter and with a membership function with values in the interval [0; 1] defined in a range of possible values of instantaneous trend of variation, and
- adjust the high cutoff frequency of the low-pass filter as a sum of the N predetermined values of high cutoff frequency respectively weighted by N degrees of membership of the estimated value of instantaneous trend of variation in each of the N states of instantaneous trend of variation, the degrees of membership being calculated using the N membership functions.

7. The measuring and tracking device according to claim 6, wherein each membership function is a Gaussian or piecewise linear function.

8. The measuring and tracking device according to claim 1, wherein the sensor is a gas sensor with a non-dispersive infrared emitter and a thermopile detector.

9. The measuring and tracking device according to claim 1, wherein the estimator is configured to estimate the value of instantaneous trend of variation of the quantitative tracking signal by providing a value of slope of the quantitative tracking signal in the predetermined sliding time window using linear regression.

10. A method for measuring and tracking over time a quantity or concentration of a component in a fluid, comprising:
- measuring the quantity or concentration of the component in the fluid and providing a quantitative signal for tracking the quantity or concentration over time, using a sensor,
- processing the quantitative tracking signal using a low-pass filter, and
- providing the filtered quantitative signal at the output,
wherein the processing of the quantitative tracking signal comprises:
- an estimation over time of an instantaneous trend of variation of the quantitative signal in a predetermined sliding time window, and
- adjustment over time of a high cutoff frequency of the low-pass filter according to the estimated instantaneous trend of variation.

11. A non-transitory computer readable medium storing instructions that, when executed by a computer or a processor, cause the computer or processor to execute the following steps:
- receiving a quantitative digital signal for tracking a quantity or concentration over time of a component in a fluid, and
- processing the quantitative tracking signal by low-pass filtering,
wherein the low-pass filtering is carried out using instructions for the execution of the following steps:
- estimating over time an instantaneous trend of variation of the quantitative signal in a predetermined sliding time window, and
- adjusting over time a high cutoff frequency of the low-pass filtering according to the estimated instantaneous trend of variation.

* * * * *